United States Patent [19]

Weck

[11] 3,841,069
[45] Oct. 15, 1974

[54] ELECTRICALLY DRIVEN LAWN MOWER

[75] Inventor: Manfred Weck, Betzdorf, Sieg, Germany

[73] Assignee: Wolf-Gerate GmbH, Bundesrepublik, Germany

[22] Filed: Apr. 2, 1973

[21] Appl. No.: 347,207

[30] Foreign Application Priority Data
Apr. 11, 1972 Germany.............................. 2217351

[52] U.S. Cl.................... 56/10.5, 56/11.1, 56/11.3, 56/11.9, 56/249
[51] Int. Cl........................................... A01d 35/24
[58] Field of Search ......... 56/10.5, 11.1, 11.3, 11.8, 56/11.9, 249

[56] References Cited
UNITED STATES PATENTS
| | | | |
|---|---|---|---|
| 1,240,561 | 9/1917 | Gore | 56/10.5 |
| 2,298,135 | 10/1942 | Klein | 56/10.5 |
| 2,417,613 | 3/1947 | Radabaugh | 56/11.9 X |
| 2,500,077 | 3/1950 | Howard | 56/11.8 X |
| 2,859,580 | 11/1958 | Salamy | 56/11.8 |
| 3,271,939 | 9/1966 | Granger, Jr. et al. | 56/10.5 |
| 3,631,659 | 1/1972 | Horowitz | 56/11.9 |

*Primary Examiner*—Louis G. Mancene
*Assistant Examiner*—J. N. Eskovitz
*Attorney, Agent, or Firm*—Ostrolenk, Faber, Gerb & Soffen

[57] ABSTRACT

The specification describes a lawn mower with a control device for changing the drive speed and comprising a stepless means for adjusting the speed of rotation of the electric motor by influencing the exciting circuit and/or the armature circuit.

10 Claims, 4 Drawing Figures

ELECTRICALLY DRIVEN LAWN MOWER

BACKGROUND OF INVENTION

The invention relates to a lawn mower with an electric motor for driving the cutting parts and the propelling parts and with a control means for setting the speed of drive of the propelling parts.

In the case of a previous as yet unpublished proposal a cylinder type lawn mower was to have means for constant speed motor rotation and for providing for driving the ground engaging roller, serving as the means propelling the lawn mower, using a free wheel coupling and at least two different gear ratios in order to drive the ground engaging roller with two speeds. During the development of this lawn mower it was assumed that the available energy can be used particularly economically keeping to a constant speed of the motor and the mowing cylinder so as to achieve favorable efficiency. Such operation economising in power would have particular advantages for battery driven lawn mowers. The disadvantage of this lawn mower resides, however, in that it can only be driven with two definite speeds and this is not satisfactory in practice when the terrain is complicated, so that it would often be necessary to declutch or switch off the motor to reduce the speed of travel of the mower or stop it when the mower drew close to an obstacle or the end of the lawn to be mown. The expense of a mechanical multispeed gear is too large for lawn mowers to be used on the gardens of dwelling houses and furthermore operation is too difficult. The same applies for steplessly adjustable mechanical drives, which have a comparatively poor mechanical efficiency which limits their application more particularly in the case of battery driven mowers.

SUMMARY OF INVENTION

One aim of the invention is to increase the ease of use of an electrically driven lawn mower by enabling the adjustment of the speed of travel to be changed rapidly and within wide limits.

In accordance with the invention a lawn mower of the above-mentioned type is provided with a control means for setting the speed with which the lawn mower is driven using a stepless change in speed of the electric motor by influencing the exciting circuit and/or the armature circuit.

The invention is based on the discovery that in recent times electronic speed of rotation control arrangements for electric motors of all types have been developed, which for example by phase cutting or the like make possible control with low losses. High-loss speed of rotation control arrangements, in the case of which a large amount of the power available is absorbed in ohmic resistances, are not suitable for domestic lawn mowers, even if the latter are driven from the line. For battery driven lawn mowers such loss regulation certainly does not come into question.

The invention makes it possible to set the speed of travel of the lawn mower individually taking into account the operator and the topography. The control system of the invention is found to be particularly advantageous on starting and stopping, since the speed of travel can be steadily increased or reduced and there is no slipping or skidding of the driving parts on the ground during acceleration or braking and running against obstacles can easily be avoided.

In accordance with a preferred embodiment of the invention the variable speed electric motor can be coupled by means of a hand operated clutch with the cylinder drive and the drive means for propelling the lawn mower. In accordance with the construction of the cutting parts and the driving mechanism additionally suitable fixed step-down ratios are provided. The ease of operation can be increased more particularly by adopting the feature that on engaging the clutch the part propelling the lawn mower can run with the lowest speed of rotation and only on engaging the clutch is it caused to move more rapidly and vice versa.

In order to exclude the possibility of faulty operation there is the provision in accordance with a further feature of the invention that a single operating lever with continuous adjustment brings about the necessary switching operations in the desired sequence: Firstly the motor is connected with the current and it is then so switched via the control means that it rotates with the smallest speed of rotation. On further displacement of the lever the clutch is engaged and it is only after this has been done that on further displacement of the lever the speed of rotation is increased. In this manner a particularly simple operation on starting and stopping is achieved. The operating lever can, in accordance with a preferred form of the invention, be constructed as a twist grip on the steering handle of the lawn mower.

The invention is applicable to all electrically driven lawn mowers. The invention is, however, particularly valuable in the case of lawn mowers of the cylinder type in the case of which the mowing or cutting cylinder and also a ground roller forming the driving mechanism are adapted to be driven. In the case of this type of lawn mower the cutting parts, that is to say the cutting cylinder, turn at a rate far under that of the motor. It has been found that with such cylinder lawn mowers a change in the speed of the cylinder due to varying the motor speed for changing the speed of the lawn mower does not have any unfavorable effect on the cutting efficiency and on travelling slowly with the cylinder turning over slowly cutting is just as satisfactory as with the lawn mower travelling fast and with the mowing cylinder turning over rapidly. There is thus no need to take steps to see that the cylinder always rotates at the same speed as has been the case up till now.

In accordance with a preferred form of the invention such a cylinder type lawn mower is so constructed that the motor, integrated constructionally with the transmission, and the clutch are arranged in the hollow ground engaging roller. This results in a more compact construction and the protection afforded the drive parts in the roller is an advantage.

In the case of a construction driven with a battery the matter can preferably also be arranged in this ground engaging roller, the arrangement being such that the stationary parts remain stationary in the roller and the drive only acts on the casing of the roller. Although a previous proposal has already been made for arranging the battery of a battery driven cylinder lawn mower in the ground engaging roller, the drive motor was to be arranged in the cylinder (see German Patent Specification 2,026,416).

In the case of the use of a wet battery care should be taken to see that it remains stationary inside the roller. If a day battery should be used, the latter can be arranged to rotate inside the roller. In the case of a battery mower the DC motor can be excited both via permanent magnets and also via a field winding. In this case the motor is preferably constructed with a planetary drive. The power then passes from the motor or the transmission via a clutch to the drive roller or possibly the drive wheel and between the clutch and the roller or the wheels gearing is preferably also provided.

The drive for the cylinder is preferably carried out via the output shaft of the drive motor via a toothed belt, and on the cylinder an overload clutch is preferably arranged in order to protect the motor if the cylinder should become blocked.

In accordance with one construction in accordance with the invention one coupling or clutch disc is mounted on the motor shaft or the drive shaft in a fixed manner. The other clutch disc is loosely mounted on the shaft and connected with a gear and begins to move only after the clutch has been engaged. The adjustment of the speed of rotation of the motor is via the armature winding in the case of permanently excited motors or via the field winding in the case of shunt motors.

With the same construction a lawn mower constructed for a battery motor can also be used for line operation using a 220 volt motor or a 380 volt motor. In this case it is advantageous if this 220 volt motor has the same speed of rotation and the same transmission as the DC motor. The stepless regulation of the speed of rotation is, in the case of such an AC motor, substantially simpler and can for example be brought about by a phase cutting regulation system or a block control means. In the case of battery operation shaping of the current is first necessary. This, however, does not constitute any unsurmountable difficulties, because both for DC motors and also for AC motors speed control mechanisms are available which operate without loss and are nevertheless relatively low in price. This regulation or control means does, however, not form the subject matter of the present invention and all suitable methods can be used which comply with the conditions required.

LIST OF SEVERAL VIEWS OF DRAWINGS

In what follows embodiments of the invention will be described with reference to the drawings.

DESCRIPTION OF PREFERRED EMBODIMENTS

Figure 1:
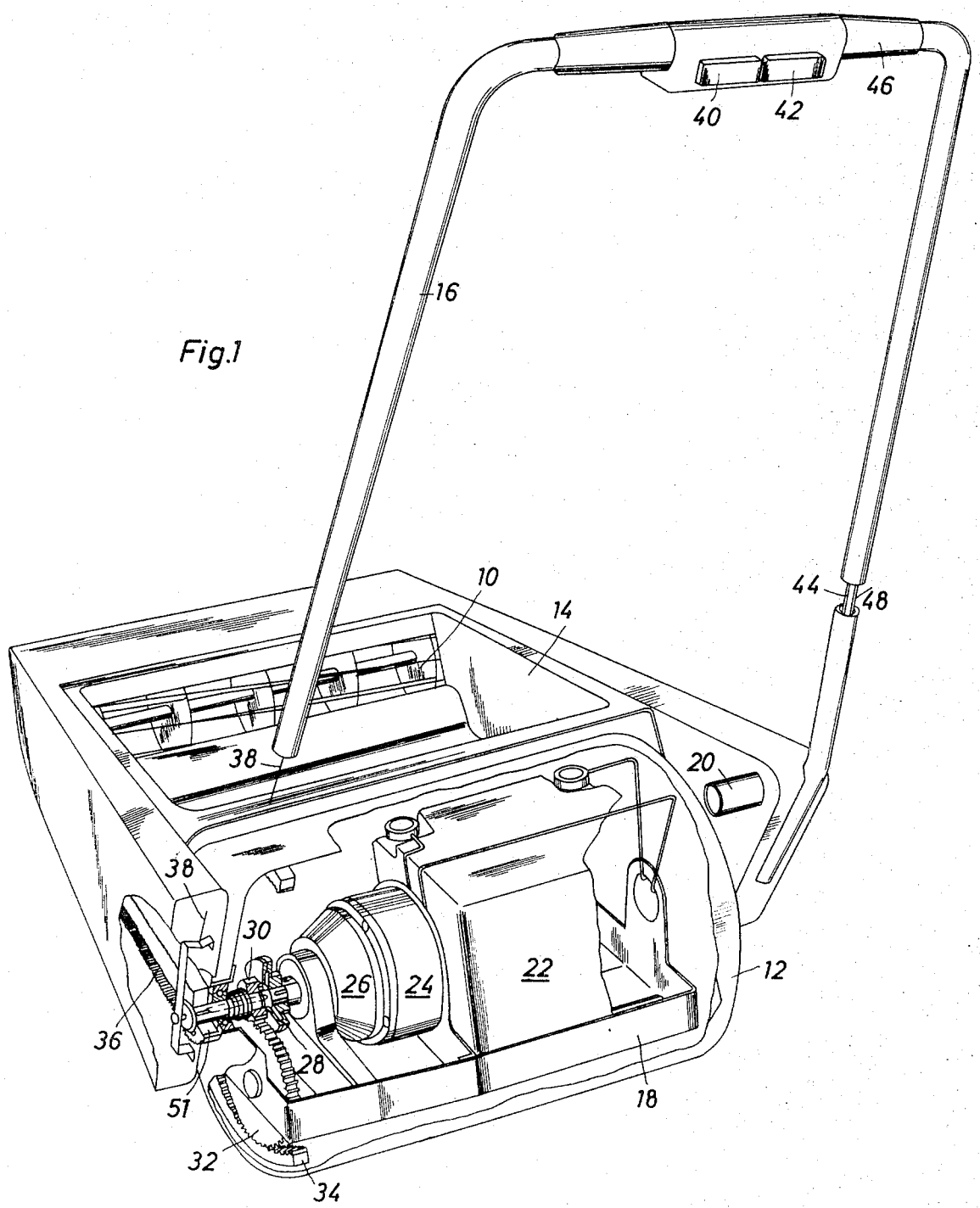
FIG. 1 is a perspective view of a partly cut away cylinder lawn mower in accordance with the invention with a drive unit accommodated in the ground engaging roller.

In accordance with FIG. 1 the lawn mower has a housing encompassing a cutting cylinder 11 at the front and at the rear of the ground engaging roller 12 for driving the lawn mower. Between the cutting cylinder 11 and the ground roller 12 there is a primary grass container 14. A steering handle 16 is fixed on the housing. The ground roller 12, which is hollow, extends around a frame 18, which is fixed laterally on the roller shaft 20, and carries the battery 22, the motor, and the transmission 26 connected with the latter as a single unit. The center of gravity of the arrangement is so arranged that the frame 18 always remains in the position indicated. The transmission 28 drives a clutch 28 driving a spur gear 30 meshing with a spur gear 32 journalled in the frame and which for its part meshes with a crown wheel 34 fixed on the inner casing of the roller 12, so as to drive the latter. The mowing cylinder is driven by the clutch 28 via a toothed belt 36. Operation of the clutch is via a Bowden (registered trade mark) cable 38, extending inside a steering handle 16 and is connected with an operating member 40 in the handle adjacent to a main switch 42 for switching the motor on and off, for which purpose connecting leads 44 pass through the hollow shaft 20 and the handle to the interior of the part of the handle held in the hand to the switch 42. A twist grip 46 on the handle is connected by a Bowden (registered trade mark) cable 48 with the motor speed control (not shown in FIG. 2).

Figure 2:
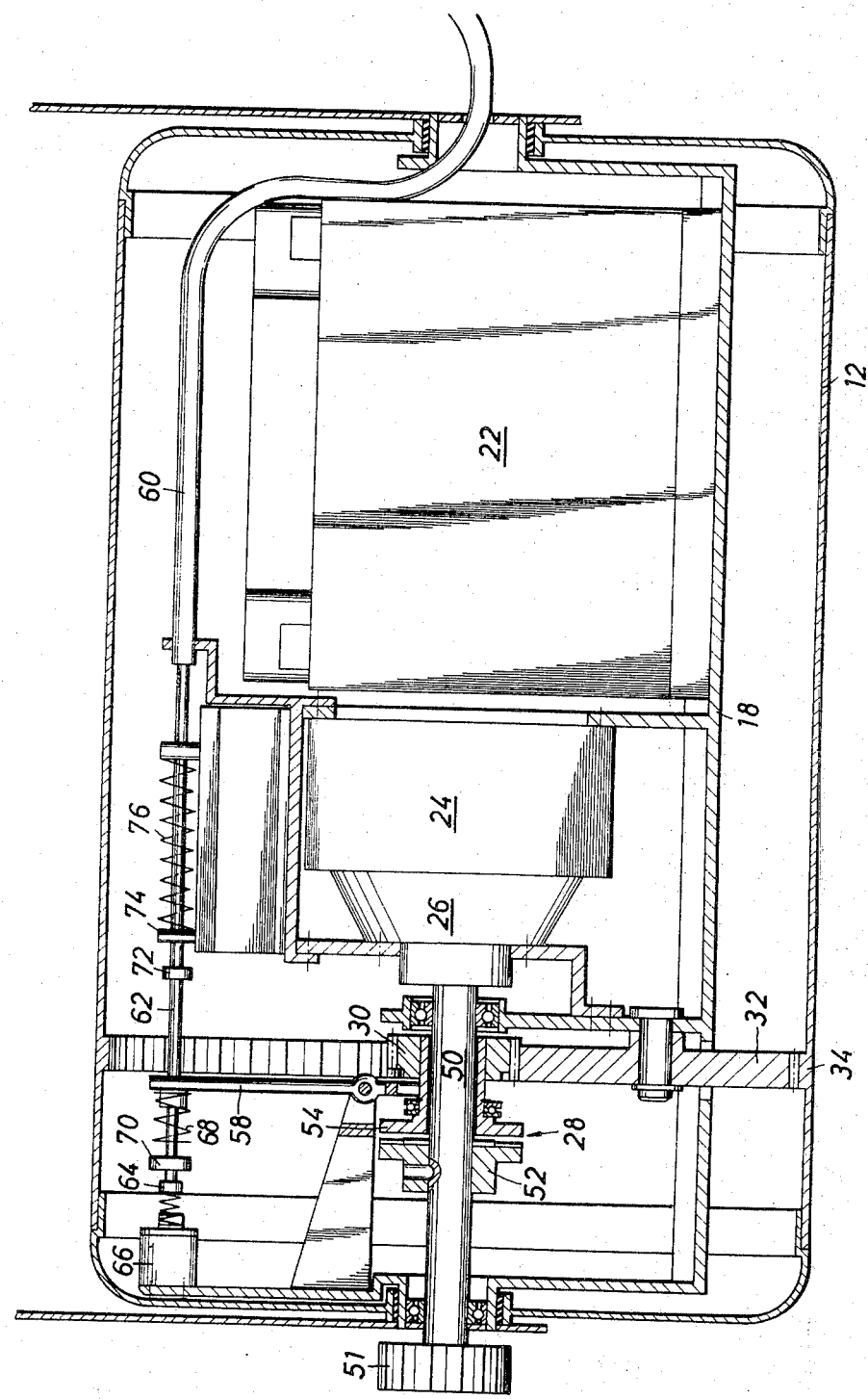
FIG. 2 is a sectional view of the ground engaging roller of a different embodiment of a cylinder lawn mower.
Figure 3:
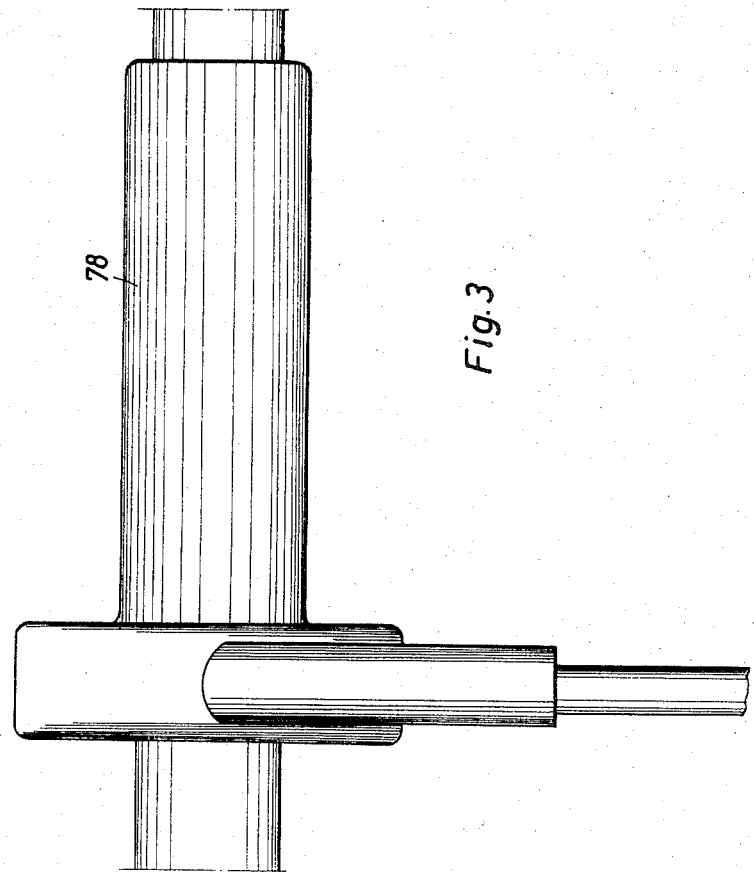
FIG. 3 is a partial view of the operating handle of the lawn mower in accordance with FIG. 2.
Figure 4:
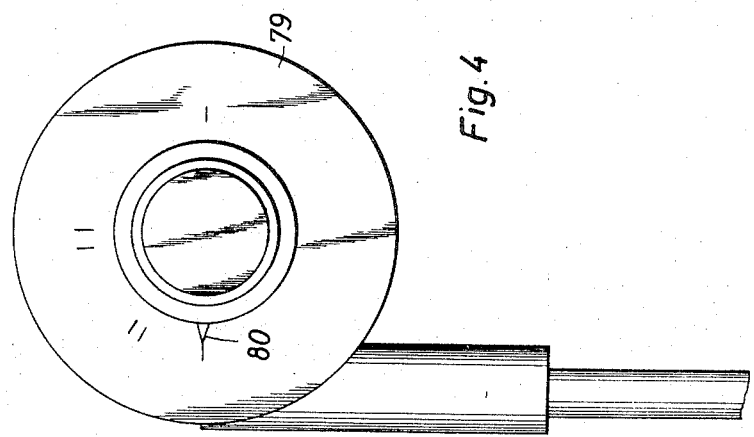
FIG. 4 is a side view of the operating handle in accordance with FIG. 3.

In the case of the embodiment of FIG. 2 corresponding parts are given the same reference numerals. The lawn mower shown in this case differs from that of FIG. 1 more particularly as regards the convenient form of actuation. In the case of this embodiment the clutch 28 has a clutch disc 52 fixed on the motor output shaft 50 and a clutch disc 54 loosely fitted on the shaft and fixed to the drive gear 30. The engagement of the clutch is brought about via a clutch lever 58 pivoting at 56 and a linkage actuated by a Bowden (registered trade mark) cable engages an operating rod 62, whose end piece 64 actuates a motor switch 66, which is switched off when the rod 62 comes into its end position moving the rod 62 to the left (see FIG. 2), just closes the switch 66 and then leads to a swinging of the clutch lever 58 (see FIG. 2), via a drive member 70 supported by a spring 68, in a clockwise direction about pivot point 56 so that the clutch disc 54 comes into engagement with the clutch disc 52 already rotating. Only when this has occurred does a further drive member 72 of the rod 62 engage an actuating element 74 which is the setting member of a speed controller, e.g. a potentiometer, and which is urged by the spring 76 with the left-hand end position, corresponding to the lowest speed of rotation. By displacement of the setting member 74 by the drive member 72 to the right the speed of rotation is increased. As can be seen from FIGS. 3 and 4 this setting is carried out by a single twist grip 78 having a pointer 80 running over a fixed scale. This twist grip 78 can be used for carrying out all operations in the desired sequence. Starting from the rest position of FIG. 3 the motor is firstly switched on by turning the grip. On turning it further the clutch for driving the lawn mower is engaged via the Bowden (registered trade mark) cable. The driving parts of the lawn mower are then set turning at the lowest speed. If the twist grip is now turned further the speed of rotation of the motor is increased together with that of the ground roller. As apparent from FIGS. 3 and 4 the overall setting needs a twist setting of about 180°. Switching on the motor occurs right at the beginning of twisting of the twist grip while the clutch is operated at about 45° of turning and the control of the speed of rotation occurs between 90° and 180°.

The embodiments shown constitute a battery driven lawn mower, but the invention is not limited to a battery driven lawn mower and instead the invention could be applied to a line driven lawn mower, in which case the supply cable would pass through the hollow shaft outwards.

I claim:

1. A power lawn mower, comprising:
cutting parts; ground engaging means comprising a hollow cylinder; an electric motor within said cylinder and connected with said ground engaging means cylinder for driving same; means operatively connecting said ground engaging means and said cutting parts for causing said ground engaging means to drive said cutting parts;
a plural position control device connected to said motor for causing stepless variation in the speed of said motor by adjusting the position of said control device;
a hand operated and hand engaged clutch connecting between said motor and said ground engaging means; said clutch being within said cylinder.

2. A lawn mower according to claim 1, wherein said mower has a handle mechanically connected with said clutch for causing engagement thereof.

3. A lawn mower according to claim 2, wherein said control device and said handle are connected to operate together and to operate in a predetermined sequence such that said clutch is engaged and thereafter the speed of said motor is varied.

4. A lawn mower according to claim 3, wherein said control device operates in the sequence to cause said motor to be switched on before said clutch is engaged.

5. A lawn mower according to claim 4, wherein both said control device and said operating handle are connected to operate together and are connected to a twistable grip which has positions thereon arranged in sequence for causing the above recited sequence of operation.

6. A lawn mower according to claim 5, further comprising:
a motion transmitting cable between said grip and said clutch for engaging said clutch and a cable joining said grip and a switch connected to said motor which turns on said motor.

7. A lawn mower according to claim 1, further comprising a battery within said cylinder, said battery being connected for feeding said motor.

8. A lawn mower according to claim 1, in which said clutch has an output member connected via spur gearing with an internal crown gear in said cylinder.

9. A lawn mower according to claim 8, in which an output shaft of said motor has a gear driving said cutting parts via a toothed belt.

10. A lawn mower according to claim 9, in which an overload clutch is provided between said toothed belt and said cutting parts.

* * * * *